United States Patent
Oshima et al.

(10) Patent No.: US 6,448,312 B1
(45) Date of Patent: Sep. 10, 2002

(54) COLORED RESIN COMPOSITION FOR WATER PIPE AND COLORED WATER PIPE

(75) Inventors: Kotaro Oshima, Inba-gun; Tohru Matsuoka, Yokohama; Yozo Nagai, Tokyo; Mitsuo Nakamura, Inba-gun, all of (JP)

(73) Assignees: High Tech Chem Co., Ltd., Narita (JP); Japan Polyolefins Co., Ltd., Tokyo (JP)

(*) Notice: Subject to any disclaimer, the term of this patent is extended or adjusted under 35 U.S.C. 154(b) by 0 days.

(21) Appl. No.: 09/958,183

(22) PCT Filed: Feb. 16, 2001

(86) PCT No.: PCT/JP01/01126

§ 371 (c)(1),
(2), (4) Date: Oct. 11, 2001

(87) PCT Pub. No.: WO01/60906

PCT Pub. Date: Aug. 23, 2001

(30) Foreign Application Priority Data

Feb. 17, 2000 (JP) .......................................... 2000-039425

(51) Int. Cl.$^7$ .............................. C08K 5/39; C08K 3/00; C08K 3/22; C08L 23/09
(52) U.S. Cl. ........................... 524/88; 524/90; 524/413
(58) Field of Search ................................ 524/88, 90, 413

(56) References Cited

U.S. PATENT DOCUMENTS 4,209,597 A  6/1980  Bremholt

FOREIGN PATENT DOCUMENTS

| EP | 0 884 350 A | 12/1998 |
|---|---|---|
| JP | 64-56747 A | 3/1989 |
| JP | 07-076639 A | 3/1995 |
| JP | 10-017726 A | 1/1998 |
| JP | 10-087904 A | 4/1998 |
| JP | 10-265620 A | 10/1998 |
| JP | 10-265621 A | 10/1998 |

OTHER PUBLICATIONS

U.S. patent application Ser. No. 09/090,171, Ohshima et al., filed Jun. 3, 1998.
JIS K 6762: (E), "Double wall polyethylene pipes for water supply", Japanese Standards Association (1998) (English version).

Primary Examiner—Kriellion A. Sanders
(74) Attorney, Agent, or Firm—Frishauf, Holtz, Goodman & Chick, P.C.

(57) ABSTRACT

A colored resin composition for water pipes which comprises (A) a polyethylene resin and (B) specific amounts of (i) a cobalt blue pigment, (ii) at least one selected from phthalocyanine pigments having no metals and metal phthalocyanine pigments having no chlorine atoms or one chlorine atom in a molecule, (iii) a dioxazine pigment and (iv) a titanium dioxide pigment and a colored water pipe which comprises the colored polyethylene resin composition and has a color tone within a specific color solid expressed by the values of the Munsell standard color table before and after the test of resistance to chlorine water for 500 hours. The composition and the water pipe are colored in a bluish color and exhibits an excellent hiding property, excellent fastness of the color tone of the coloring component to water containing chlorine and an excellent property for preventing formation of blisters in water containing chlorine.

9 Claims, No Drawings

COLORED RESIN COMPOSITION FOR WATER PIPE AND COLORED WATER PIPE

TECHNICAL FIELD

The present invention relates to a colored resin composition for water pipes and a colored water pipe (including joints for water pipes, similarly hereinafter). More particularly, the present invention relates to a colored resin composition for water pipes which is colored in a bluish color, exhibits an excellent fastness of color tone of the coloring component to water containing chlorine and an excellent property for preventing formation of blisters in water containing chlorine, has a color tone within a specific color solid expressed by the values of a Munsell standard color table and shows an excellent hiding property, and a colored water pipe having the above properties of the color tone.

BACKGROUND ART

As major pigments for coloring water pipes to bluish colors, organic pigments such as phthalocyanine blue pigments or indanthrene blue pigments, or inorganic pigments such as ultramarine blue pigments or cobalt blue pigments are used.

When a commercially available copper phthalocyanine blue pigment having no chlorine atoms or one chlorine atom is used singly for this application, the copper phthalocyanine blue pigment is decomposed by the oxidizing action of chlorine water and rapid discoloration takes place in the test of resistance to chlorine water. Blisters are occasionally formed on the surface of a test plate when some types of the copper phthalocyanine pigments are used.

It is reported in Japanese Patent Application Laid-Open No. Heisei 7(1995)-76639 that a phthalocyanine blue pigment having copper, zinc, nickel, iron or hydrogen as the central atom and 2 to 10 chlorine atoms introduced therein provides a colored resin composition having an excellent resistance to discoloration with water containing chlorine. However, in the test of resistance to chlorine water using a colored resin composition containing the above phthalocyanine blue pigment, a problem arises in that the above test plate shows formation of blisters on the surface in a shorter time than test plates containing conventional copper phthalocyanine blue pigments do. Moreover, the color tone is not within the color solid composed of the hue in the range of 10 B to 10 PB, the lightness in the range of 2 to 6 and the chroma in the range of 4 to 14 each expressed by the values of the Munsell standard color table.

When it is considered that the discoloration and the formation of blisters take place in the test of resistance to chlorine water in the use of any types of phthalocyanine blue pigments, it should be avoided that the phthalocyanine blue pigment alone is used in the present application although the phthalocyanine blue pigments have a great coloring ability and provide a great economic advantage.

Indanthrene blue pigments have a coloring ability as excellent as that of the phthalocyanine blue pigments. However, in the test of resistance to chlorine water of a resin composition containing an indanthrene blue pigment in an amount of 0.05% by weight or more of the resin component, unfavorable phenomena arise in that blisters are formed and the color tone changes into dark green. Therefore, the use of indanthrene blue pigments should be avoided.

When a colored resin composition containing an ultramarine blue pigment is used, it is inevitable that marked discoloration takes place in the test of resistance to chlorine water since the ultramarine blue pigment is vulnerable to acids. Therefore, it is preferable that an ultramarine blue pigment is not used for water pipes for water sterilized with chlorine. Moreover, since the ultramarine blue pigments have smaller coloring ability than those of phthalocyanine blue pigments and indanthrene blue pigments, a combined use of the ultramarine blue pigments with other pigments is not advantageous.

Cobalt blue pigments exhibit less discoloration in the test of resistance to chlorine water and form no blisters when the used amount is 2.0% by weight or less. However, since the cobalt blue pigment has an inferior coloring ability, the cobalt blue pigment must be used in a greater amount for obtaining suitable color tone and color concentration when the cobalt blue pigment is used alone and blisters tend to be formed in the test of resistance to chlorine water. Moreover, economic disadvantage arises. Therefore, it is difficult that the cobalt blue pigment is used alone.

When the cobalt blue pigment is used as the main pigment and the color tone is brought within the color solid composed of the hue in the range of 10 B to 10 PB, the lightness in the range of 2 to 6 and the chroma in the range of 4 to 14 each expressed by the values of the Munsell standard color table, the addition of a reddish pigment is essential. However, reddish pigments other than dioxazine pigments have drawbacks. When a quinacridone pigments is added, dark dim color tone is obtained. When an azo pigment or a perylene pigment is added, the color becomes red after the test of resistance to chlorine water due to excessively excellent resistance to chlorine water and unpleasant impression is obtained.

Under the above circumstances, the present invention has an object of providing a colored resin composition for water pipes which is colored in a bluish color, has a color tone within the color solid composed of the hue in the range of 10 B to 10 PB, the lightness in the range of 2 to 6 and the chroma in the range of 4 to 14 each expressed by the values of the Munsell standard color table, exhibits an excellent hiding property, excellent fastness of the color tone of the coloring component to chlorine water and an excellent property for preventing formation of blisters in chlorine water, has a color tone within the above specific color solid expressed by the values of the Munsell standard color table even after the test of resistance to chlorine water and is economically advantageous, and a colored water pipe having the above properties of the color tone.

DISCLOSURE OF THE INVENTION

As the result of extensive studies by the present inventors to develop the colored resin composition for water pipes which is colored in a bluish color, has an excellent hiding property and exhibits the above properties of color tone, it was found that the object can be achieved with a colored resin composition which is a combination of a polyethylene resin and specific pigments in specific relative amounts. The present invention has been completed based on the knowledge.

The present invention provides:

(1) A colored resin composition for water pipes which comprises (A) a polyethylene resin and, per 100 parts by weight of the polyethylene resin, (B) 0.01 to 2.0 parts by weight of (i) a cobalt blue pigment, 0.0001 to 0.2 parts by weight of (ii) at least one pigment selected from phthalocyanine pigments having no metals and metal phthalocyanine pigments having no chlorine atoms or one chlorine atom in a molecule, 0.0001 to 0.2 parts by weight of (iii) a dioxazine pigment and 0.002 to 0.5 parts by weight of (iv) a titanium dioxide pigment;

(2) A colored resin composition for water pipes described in (1), wherein a color tone is within a color solid composed of a hue in a range of 10 B to 10 PB, a lightness in a range of 2 to 6 and a chroma in a range of 4 to 14 each expressed by values of a Munsell standard color table;

(3) A colored resin composition for water pipes described in any one of (1) and (2), wherein a color tone is within a color solid composed of a hue in a range of 10 B to 10 PB, a lightness in a range of 2 to 6 and a chroma in a range of 4 to 14 each expressed by values of a Munsell standard color table after a test of resistance to chlorine water in accordance with a method of Japanese Industrial Standard K 6762 for 500 hours;

(4) A colored resin composition for water pipes described in any one of (1), (2) and (3), wherein the dioxazine pigment of component (iii) of component (B) is at least one compound selected from compounds expressed by formula [1] and formula [2]:

[1]

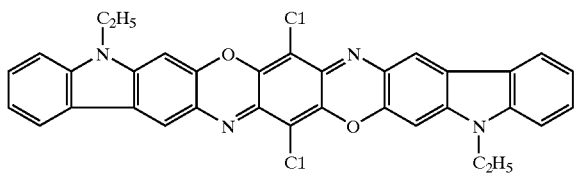

[2]

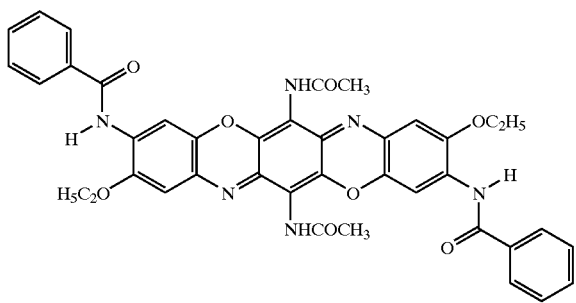

and (5) A colored water pipe which comprises a colored polyethylene resin composition and has a color tone within a color solid composed of a hue in a range of 10 B to 10 PB, a lightness in a range of 2 to 6 and a chroma in a range of 4 to 14 each expressed by values of a Munsell standard color table before and after a test of resistance to chlorine water in accordance with a method of Japanese Industrial Standard K 6762 for 500 hours.

The colored water pipes in the present invention includes joints for water pipes.

THE MOST PREFERRED EMBODIMENT TO CARRY OUT THE INVENTION

In the colored resin composition for water pipes of the present invention (hereinafter, referred to as the resin composition of the present invention), the polyethylene resin used as component (A) is a conventional polyethylene resin used for extrusion molding and injection molding. For example, a polyethylene resin having a density in the range of 0.945 to 0.970 g/cm³ and a melt flow rate (MFR) in the range of 0.01 to 1 g/10 minutes under a load of 2.16 kg can be used.

In the resin composition of the present invention, a combination of (i) a cobalt blue pigment, (ii) a phthalocyanine pigment, (iii) a dioxazine pigment and (iv) a titanium dioxide pigment is used as the coloring agent of component (B).

The cobalt blue pigment of component (i) is the main pigment which colors the resin composition of the present invention into a bluish color.

The amount is selected in the range of 0.01 to 2.0 parts by weight per 100 parts by weight of the polyethylene resin of component (A). When the amount is less than 0.01 part by weight, the coloring ability is small and marked discoloration takes place after the test of resistance to chlorine water. Moreover, there is the possibility that the color tone after the test is outside the color solid composed of the hue in the range of 19 B to 10 PB, the lightness in the range of 2 to 6 and the chroma in the range of 4 to 14 each expressed by the values of the Munsell standard color table. When the amount exceeds 2.0 parts by weight, blisters tend to be formed in the test of resistance to chlorine water. From the standpoint of the coloring ability and the resistance to chlorine water, it is preferable that the amount of the cobalt blue pigment is in the range of 0.05 to 1.0 part by weight and more preferably in the range of 0.05 to 0.5 parts by weight.

As the phthalocyanine pigment of component (ii), at least one pigment selected from phthalocyanine pigments having no metals and metal phthalocyanine pigments having no chlorine atoms or one chlorine atom in the molecule is used.

The phthalocyanine pigment of component (ii) is used as the auxiliary pigment for coloring the resin composition of the present invention into a bluish color. The amount is selected in the range of 0.0001 to 0.2 parts by weight per 100 parts by weight of the polyethylene resin of component (A). When the amount is less than 0.0001 part by weight, the coloring ability is small. When the amount exceeds 0.2 parts by weight, blisters tend to be formed in the test of resistance to chlorine water. From the standpoint of the coloring ability and the resistance to chlorine water, it is preferable that the amount of the phthalocyanine pigment is in the range of 0.001 to 0.1 part by weight and more preferably in the range of 0.005 to 0.08 parts by weight.

The dioxazine pigment of component (iii) is used as the auxiliary pigment for coloring the resin composition of the present invention into a reddish color.

As the dioxazine pigment, for example, at least one compound selected from compounds expressed by formula [1] and formula [2] is preferably used.

[1]

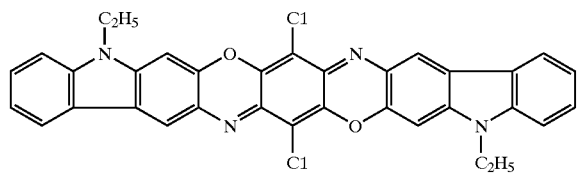

-continued

[2]

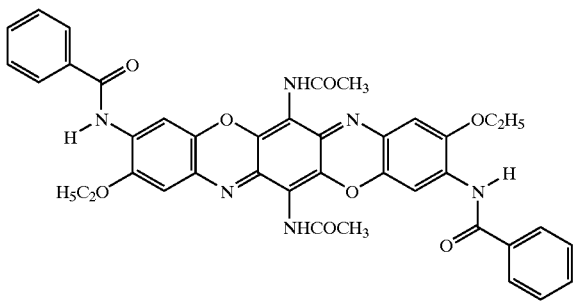

The amount of the dioxazine pigment is selected in the range of 0.0001 to 0.2 parts by weight per 100 parts by weight of the polyethylene resin of component (A). When the amount is less than 0.0001 part by weight, the coloring ability is small. When the amount exceeds 0.2 parts by weight, blisters tend to be formed in the test of resistance to chlorine water. Moreover, there is the possibility that the color tone after the test is outside the color solid composed of the hue in the range of 10 B to 10 PB, the lightness in the range of 2 to 6 and the chroma in the range of 4 to 14 each expressed by the values of the Munsell standard color table. From the standpoint of the coloring ability, the resistance to chlorine water and the color tone, it is preferable that the amount of the dioxazine pigment is in the range of 0.0001 to 0.01 part by weight and more preferably in the range of 0.0005 to 0.01 part by weight.

The titanium dioxide pigment of component (iv) is used for providing the resin composition of the present invention with the hiding property. The amount is selected in the range of 0.002 to 0.5 parts by weight per 100 parts by weight of the polyethylene resin of component (A). When the amount is less than 0.002 parts by weight, the effect of providing the hiding property is insufficient. When the amount exceeds 0.5 parts by weight, there is the possibility that the color tone becomes white. From the standpoint of the hiding property and the color tone, it is preferable that the amount is in the range of 0.01 to 0.1 part by weight and more preferably in the range of 0.02 to 0.08 parts by weight.

The resin composition of the present invention may further comprise various additives such as antioxidants, ultraviolet light absorbers, photostabilizers, antistatic agents, antimicrobial agents and crosslinking agents, resins other than the polyethylene resin such as polypropylene, polybutene, polyester resins, acrylic resins and polyurethane resins and inorganic fillers such as talc, clay, silica and alumina in addition to the polyethylene resin of component (A) and the coloring agents of component (B).

It makes no problems that a highly concentrated master batch containing the pigments in amounts 20 or 30 times as much as the amounts in the resin composition finally used for production of pipes is prepared and the prepared master batch is used as the colored resin composition for water pipes of the present invention after diluting with a natural resin.

It is preferable that the colored resin composition for water pipes of the present invention has a color tone within the color solid composed of the hue in the range of 10 B to 10 PB, the lightness in the range of 2 to 6 and the chroma in the range of 4 to 14 each expressed by the values of the Munsell standard color table and that the colored resin composition has a color tone within the above color solid expressed by the values of the Munsell standard color table after being subjected to the test of resistance to chlorine water in accordance with the method of Japanese Industrial Standard K 6762 for 500 hours.

The present invention also provides a colored water pipe.

The colored water pipe of the present invention comprises the colored polyethylene resin composition having a color tone within the color solid composed of the hue in the range of 10 B to 10 PB, the lightness in the range of 2 to 6 and the chroma in the range of 4 to 14 each expressed by the values of the Munsell standard color table before and after the test of resistance to chlorine water in accordance with the method of Japanese Industrial Standard K 6762 for 500 hours. It is preferable that the colored polyethylene resin composition has a color tone within the color solid composed of the hue in the range of 1 PB to 7 PB, the lightness in the range of 2.5 to 5.5 and the chroma in the range of 6 to 12 each expressed as the values of the Munsell standard color table.

The colored water pipe can be produced from the above resin composition of the present invention in accordance with a conventional process. The water pipe is colored to a bluish color and exhibits an excellent hiding property, excellent fastness of color tone to water containing chlorine and excellent property for preventing formation of blisters in water containing chlorine.

EXAMPLES

The present invention will be described more specifically with reference to examples in the following. However, the present invention is not limited to the examples.

Example 1

A colored resin composition for water pipes was obtained from 100 parts by weight of a high density polyethylene (the density: 0.949 g/cm$^3$; MFR: 0.10 g/10 min), 0.28 parts by weight of a polyethylene wax (the density: 0.94 g/cm$^3$; the molecular weight: 3,000), 0.2 parts by weight of a cobalt blue pigment (C. I. Pigment Blue 28), 0.02 parts by weight of a phthalocyanine blue pigment having no metals (C. I. Pigment Blue 16), 0.01 part by weight of a dioxazine violet pigment (C. I. Pigment Violet 23) and 0.05 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 2

A colored resin composition for water pipes was obtained from 100 parts by weight of a high density polyethylene (the density: 0.949 g/cm$^3$; MFR: 0.10 g/10 min), 0.58 parts by weight of a polyethylene wax (the density: 0.93 g/cm$^3$; the molecular weight: 2,000), 0.4 parts by weight of a cobalt blue pigment (C. I. Pigment Blue 28), 0.02 parts by weight of a phthalocyanine blue pigment having no metals (C. I. Pigment Blue 16), 0.02 parts by weight of a copper phthalocyanine pigment (C. I. Pigment Blue 15:1), 0.008 parts by weight of a dioxazine violet pigment (C. I. Pigment Violet 23) and 0.1 part by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 3

A colored resin composition for water pipes was obtained from 100 parts by weight of a high density polyethylene (the density: 0.949 g/cm$^3$; MFR: 0.10 g/10 min), 0.92 parts by weight of a polyethylene wax (the density: 0.94 g/cm$^3$; the molecular weight: 3,000), 0.05 parts by weight of a cobalt blue pigment (C. I. Pigment Blue 28), 0.02 parts by weight of a phthalocyanine blue pigment having no metals (C. I. Pigment Blue 16), 0.04 parts by weight of a copper phthalocyanine pigment (C. I. Pigment Blue 15:3), 0.01 part by weight of a dioxazine violet pigment (C. I. Pigment Violet 37) and 0.05 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 4

A colored resin composition for water pipes was obtained from 100 parts by weight of a high density polyethylene (the density: 0.949 g/cm$^3$; MFR: 0.10 g/10 min), 0.54 parts by weight of calcium stearate, 0.4 parts by weight of a cobalt blue pigment (C. I. Pigment Blue 28), 0.02 parts by weight of a phthalocyanine blue pigment having no metals (C. I. Pigment Blue 16), 0.008 parts by weight of a dioxazine violet pigment (C. I. Pigment Violet 23) and 0.1 part by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 5

A colored resin composition for water pipes was obtained from 100 parts by weight of a high density polyethylene (the density: 0.949 g/cm$^3$; MFR: 0.10 g/10 min), 0.48 parts by weight of magnesium stearate, 0.4 parts by weight of a cobalt blue pigment (C. I. Pigment Blue 28), 0.02 parts by weight of a phthalocyanine blue pigment having no metals (C. I. Pigment Blue 16), 0.01 part by weight of a dioxazine violet pigment (C. I. Pigment Violet 23) and 0.05 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 6

A colored resin composition for water pipes was obtained from 100 parts by weight of a high density polyethylene (the density: 0.949 g/cm$^3$; MFR: 0.10 g/10 min), 0.39 parts by weight of a polyethylene wax (the density: 0.94 g/cm$^3$; the molecular weight: 3,000), 0.3 parts by weight of a cobalt blue pigment (C. I. Pigment Blue 28), 0.03 parts by weight of a phthalocyanine blue pigment having no metals (C. I. Pigment Blue 16), 0.005 parts by weight of a dioxazine violet pigment (C. I. Pigment Violet 23) and 0.055 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 7

A colored resin composition for water pipes was obtained from 100 parts by weight of a high density polyethylene (the density: 0.949 g/cm$^3$; MFR: 0.10 g/10 min), 0.51 parts by weight of a polyethylene wax (the density: 0.94 g/cm$^3$; the molecular weight: 3,000), 0.4 parts by weight of a cobalt blue pigment (C. I. Pigment Blue 28), 0.06 parts by weight of a phthalocyanine blue pigment having no metals (C. I. Pigment Blue 16), 0.005 parts by weight of a dioxazine violet pigment (C. I. Pigment Violet 37) and 0.045 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm ×120 mm was prepared from the molded sheet.

Example 8

A blue master batch for water pipes was obtained from 100 parts by weight of a high density polyethylene (the density: 0.949 g/cm$^3$; MFR: 0.10 g/10 min), 5.6 parts by weight of a polyethylene wax (the density: 0.94 g/cm$^3$; the molecular weight: 3,000), 4 parts by weight of a cobalt blue pigment (C. I. Pigment Blue 28), 0.4 parts by weight of a phthalocyanine blue pigment having no metals (C. I. Pigment Blue 16), 0.2 parts by weight of a dioxazine violet pigment (C. I. Pigment Violet 23) and 1 part by weight of titanium dioxide (C. I. Pigment White 6) by mixing the components using a two-roll mixer at 185° C. for 2 minutes. The obtained master batch was diluted with a high density polyethylene (the density: 0.949 g/cm$^3$; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 9

A blue master batch for water pipes was obtained from 100 parts by weight of a high density polyethylene (the density: 0.949 g/cm³; MFR: 0.10 g/10 min), 2 parts by weight of a polyethylene wax (the density: 0.94 g/cm³; the molecular weight: 3,000), 1 part by weight of a cobalt blue pigment (C. I. Pigment Blue 28), 0.4 parts by weight of a phthalocyanine blue pigment having no metals (C. I. Pigment Blue 16), 0.4 parts by weight of a copper phthalocyanine pigment (C. I. Pigment Blue 15:3), 0.2 parts by weight of a dioxazine violet pigment (C. I. Pigment Violet 37) and 1 part by weight of titanium dioxide (C. I. Pigment White 6) by mixing the components using a two-roll mixer at 185° C. for 2 minutes. The obtained master batch was diluted with a high density polyethylene (the density: 0.949 g/cm³; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Example 10

A blue master batch for water pipes was obtained from 100 parts by weight of a high density polyethylene (the density: 0.949 g/cm³; MFR: 0.10 g/10 min), 9.6 parts by weight of magnesium stearate, 8 parts by weight of a cobalt blue pigment (C. I. Pigment Blue 28), 0.4 parts by weight of a phthalocyanine blue pigment having no metals (C. I. Pigment Blue 16), 0.2 parts by weight of a dioxazine violet pigment (C. I. Pigment Violet 23) and 1 part by weight of titanium dioxide (C. I. Pigment White 6) by mixing the components using a two-roll mixer at 185° C. for 2 minutes. The obtained master batch was diluted with a high density polyethylene (the density: 0.949 g/cm³; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm ×120 mm was prepared from the molded sheet.

Comparative Example 1

A colored resin composition for water pipes was obtained from 100 parts by weight of a high density polyethylene (the density: 0.949 g/cm³; MFR: 0.10 g/10 min), 0.28 parts by weight of a polyethylene wax (the density: 0.94 g/cm³; the molecular weight: 3,000), 0.2 parts by weight of a cobalt blue pigment (C. I. Pigment Blue 28), 0.02 parts by weight of a phthalocyanine blue pigment having no metals (C. I. Pigment Blue 16), 0.01 part by weight of an azo red pigment (C. I. Pigment Red 242) and 0.05 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm ×120 mm was prepared from the molded sheet.

Comparative Example 2

A colored resin composition for water pipes was obtained from 100 parts by weight of a high density polyethylene (the density: 0.949 g/cm³; MFR: 0.10 g/10 min), 0.65 parts by weight of a polyethylene wax (the density: 0.94 g/cm³; the molecular weight: 3,000), 0.5 parts by weight of a cobalt blue pigment (C. I. Pigment Blue 28), 0.03 parts by weight of a phthalocyanine blue pigment having no metals (C. I. Pigment Blue 16), 0.02 parts by weight of a perylene red pigment (C. I. Pigment Red 149) and 0.1 part by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 3

A colored resin composition for water pipes was obtained from 100 parts by weight of a high density polyethylene (the density: 0.949 g/cm³; MFR: 0.10 g/10 min), 0.45 parts by weight of a polyethylene wax (the density: 0.94 g/cm³; the molecular weight: 3,000), 0.3 parts by weight of a cobalt blue pigment (C. I. Pigment Blue 28), 0.04 parts by weight of a phthalocyanine blue pigment having no metals (C. I. Pigment Blue 16), 0.01 part by weight of a quinacridone red pigment (C. I. Pigment Red 122) and 0.1 part by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 4

A colored resin composition for water pipes was obtained from 100 parts by weight of a high density polyethylene (the density: 0.949 g/cm³; MFR: 0.10 g/10 min), 0.87 parts by weight of a polyethylene wax (the density: 0.94 g/cm³; the molecular weight: 3,000), 0.6 parts by weight of a cobalt blue pigment (C. I. Pigment Blue 28), 0.05 parts by weight of an anthraquinone blue pigment (C. I. Pigment Blue 60), 0.02 parts by weight of a dioxazine violet pigment (C. I. Pigment Violet 23) and 0.2 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 5

A colored resin composition for water pipes was obtained from 100 parts by weight of a high density polyethylene (the density: 0.949 g/cm³; MFR: 0.10 g/10 min), 0.65 parts by weight of a polyethylene wax (the density: 0.94 g/cm³; the molecular weight: 3,000), 0.5 parts by weight of a cobalt blue pigment (C. I. Pigment Blue 28), 0.03 parts by weight of a copper phthalocyanine blue pigment (4Cl-copper phthalocyanine blue), 0.02 parts by weight of a dioxazine violet pigment (C. I. Pigment Violet 23) and 0.1 part by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 6

A colored resin composition for water pipes was obtained from 100 parts by weight of a high density polyethylene (the density: 0.949 g/cm$^3$; MFR: 0.10 g/10 min), 0.825 parts by weight of a polyethylene wax (the density: 0.94 g/cm$^3$; the molecular weight: 3,000), 0.005 parts by weight of a cobalt blue pigment (C. I. Pigment Blue 28), 0.6 parts by weight of a ultramarine blue pigment (C. I. Pigment Violet 15), 0.02 parts by weight of a dioxazine violet pigment (C. I. Pigment Violet 23) and 0.2 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm ×120 mm was prepared from the molded sheet.

Comparative Example 7

A colored resin composition for water pipes was obtained from 100 parts by weight of a high density polyethylene (the density: 0.949 g/cm$^3$; MFR: 0.10 g/10 min), 2.37 parts by weight of magnesium stearate, 2.3 parts by weight of a cobalt blue pigment (C. I. Pigment Blue 28), 0.02 parts by weight of a dioxazine violet pigment (C. I. Pigment Violet 23) and 0.05 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm ×120 mm was prepared from the molded sheet.

Comparative Example 8

A blue master batch for water pipes was obtained from 100 parts by weight of a high density polyethylene (the density: 0.949 g/cm$^3$; MFR: 0.10 g/10 min), 5.34 parts by weight of a polyethylene wax (the density: 0.94 g/cm$^3$; the molecular weight: 3,000), 0.14 parts by weight of a cobalt blue pigment (C. I. Pigment Blue 28), 4 parts by weight of a phthalocyanine blue pigment having no metals (C. I. Pigment Blue 16), 0.2 parts by weight of an azo red pigment (C. I. Pigment Red 242) and 1 part by weight of titanium dioxide (C. I. Pigment White 6) by mixing the components using a two-roll mixer at 185° C. for 2 minutes. The obtained master batch was diluted with a high density polyethylene (the density: 0.949 g/cm$^3$; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm ×120 mm was prepared from the molded sheet.

Comparative Example 9

A blue master batch for water pipes was obtained from 100 parts by weight of a high density polyethylene (the density: 0.949 g/cm$^3$; MFR: 0.10 g/10 min), 6.4 parts by weight of a polyethylene wax (the density: 0.94 g/cm$^3$; the molecular weight: 3,000), 2 parts by weight of a copper phthalocyanine pigment (C. I. Pigment Blue 15:1), 0.4 parts by weight of a dioxazine violet pigment (C. I. Pigment Violet 23) and 4 parts by weight of titanium dioxide (C. I. Pigment White 6) by mixing the components using a two-roll mixer at 185° C. for 2 minutes. The obtained master batch was diluted with a high density polyethylene (the density: 0.949 g/cm$^3$; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 10

A colored resin composition for water pipes was obtained from 100 parts by weight of a high density polyethylene (the density: 0.949 g/cm$^3$; MFR: 0.10 g/10 min), 12.42 parts by weight of a polyethylene wax (the density: 0.94 g/cm$^3$; the molecular weight: 3,000), 10 parts by weight of a cobalt blue pigment (C. I. Pigment Blue 28), 2 parts by weight of a copper phthalocyanine blue pigment (C. I. Pigment Blue 15:1), 0.4 parts by weight of a dioxazine violet pigment (C. I. Pigment Violet 23) and 0.02 parts by weight of titanium dioxide (C. I. Pigment White 6) by mixing the components using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 11

A blue master batch for water pipes was obtained from 100 parts by weight of a high density polyethylene (the density: 0.949 g/cm$^3$; MFR: 0.10 g/10 min), 32.8 parts by weight of a polyethylene wax (the density: 0.94 g/cm$^3$; the molecular weight: 3,000), 8 parts by weight of a cobalt blue pigment (C. I. Pigment Blue 28), 0.4 parts by weight of a phthalocyanine blue pigment having no metals (C. I. Pigment Blue 16), 0.2 parts by weight of a dioxazine violet pigment (C. I. Pigment Violet 23) and 20 parts by weight of titanium dioxide (C. I. Pigment White 6) by mixing the components using a two-roll mixer at 185° C. for 2 minutes. The obtained master batch was diluted with a high density polyethylene (the density: 0.949 g/cm$^3$; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 12

A blue master batch for water pipes was obtained from 100 parts by weight of a high density polyethylene (the density: 0.949 g/cm$^3$; MFR: 0.10 g/10 min), 12.601 parts by weight of a polyethylene wax (the density: 0.94 g/cm$^3$; the molecular weight: 3,000), 12 parts by weight of a cobalt blue pigment (C. I. Pigment Blue 28), 0.2 parts by weight of a phthalocyanine blue pigment having no metals (C. I. Pigment Blue 16), 0.001 part by weight of a dioxazine violet pigment (C. I. Pigment Violet 23) and 0.4 parts by weight of titanium dioxide (C. I. Pigment White 6) by mixing the components using a two-roll mixer at 185° C. for 2 minutes. The obtained master batch was diluted with a high density polyethylene (the density: 0.949 g/cm$^3$; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

Comparative Example 13

A blue master batch for water pipes was obtained from 100 parts by weight of a high density polyethylene (the density: 0.949 g/cm$^3$; MFR: 0.10 g/10 min), 15 parts by weight of a polyethylene wax (the density: 0.94 g/cm$^3$; the molecular weight: 3,000), 8 parts by weight of a cobalt blue pigment (C. I. Pigment Blue 28), 0.2 parts by weight of a phthalocyanine blue pigment having no metals (C. I. Pigment Blue 16), 6 parts by weight of a dioxazine violet pigment (C. I. Pigment Violet 23) and 0.8 parts by weight of titanium dioxide (C. I. Pigment White 6) by mixing the components using a two-roll mixer at 185° C. for 2 minutes. The obtained master batch was diluted with a high density polyethylene (the density: 0.949 g/cm$^3$; MFR: 0.10 g/10 min). A colored resin composition for water pipes in an amount of 20 times the amount of the master batch was obtained by mixing the master batch and the high density polyethylene using a two-roll mixer at 185° C. for 2 minutes.

The above composition was molded by compression using a heating press; a sheet having a thickness of 2 mm was prepared under the condition of preheating at 230° C. for 2 minutes, compressing at 230° C. for 2 minutes and cooling at 20° C. for 5 minutes. A test piece of 20 mm×120 mm was prepared from the molded sheet.

The test pieces obtained in Examples and Comparative Examples were tested in accordance with the following methods.

The test of resistance to chlorine water was conducted in accordance with the method of Japanese Industrial Standard K 6762 and the formation of blisters and the change in the color tone were visually observed.

The conditions of the test were as follows:
The concentration of chlorine water: 2000±100 ppm
The temperature of chlorine water: 60±1° C.
pH of chlorine water: 6.5±0.5

Test time (period) 168, 500, 1,000 hours
The thickness of the test piece: 2 mm
The formation of blisters was evaluated in accordance with the following criteria:
good: no blisters found
fair: some blisters found
poor: numerous blisters found
The color tone was evaluated in accordance with the following criteria:
good: within the color solid composed of the hue in the range of 10 B to 10 PB, the lightness in the range of 2 to 6 and the chroma in the range of 4 to 14 each expressed as the values of the Munsell standard color table
poor: outside the color solid composed of the hue in the range of 10 B to 10 PB, the lightness in the range of 2 to 6 and the chroma in the range of 4 to 14 each expressed as the values of the Munsell standard color table
The hiding property was evaluated in accordance with the following criteria:
good: a great ability of hiding
poor: a poor ability of hiding
The results are shown in Tables 1 and 2.

TABLE 1

| | Evaluation of resistance to chlorine water | | | | | | |
|---|---|---|---|---|---|---|---|
| | 168 hour | | 500 hours | | 1,000 hours | | |
| Example | blisters | color tone | blisters | color tone | blisters | color tone | Hiding property |
| 1 | good | good | good | good | good | good | good |
| 2 | good | good | good | good | good | good | good |
| 3 | good | good | good | good | good | good | good |
| 4 | good | good | good | good | good | good | good |
| 5 | good | good | good | good | good | good | good |
| 6 | good | good | good | good | good | good | good |
| 7 | good | good | good | good | good | good | good |
| 8 | good | good | good | good | good | good | good |
| 9 | good | good | good | good | good | good | good |
| 10 | good | good | good | good | good | good | good |

TABLE 2

| | Evaluation of resistance to chlorine water | | | | | | |
|---|---|---|---|---|---|---|---|
| | 168 hour | | 500 hours | | 1,000 hours | | |
| Comparative Example | blisters | color tone | blisters | color tone | blisters | color tone | Hiding property |
| 1 | good | good | good | poor | good | poor | good |
| 2 | good | good | good | poor | good | poor | good |
| 3 | good | good | good | poor | good | poor | good |
| 4 | good | good | fair | poor | poor | poor | good |
| 5 | good | good | poor | poor | poor | poor | good |
| 6 | good | good | good | poor | good | poor | good |
| 7 | good | good | fair | good | poor | good | good |
| 8 | good | good | good | poor | good | poor | good |
| 9 | good | good | good | poor | good | poor | good |
| 10 | good | good | good | poor | good | poor | poor |
| 11 | good | good | good | poor | fair | poor | good |
| 12 | good | good | good | poor | good | poor | good |
| 13 | good | good | poor | poor | poor | poor | good |

The colored resin compositions for water pipes of the present invention exhibited little discoloration and excellent property for preventing forming of blisters to water containing chlorine and had color tones within the color solid composed of the hue in the range of 10 B to 10 PB, the lightness in the range of 2 to 6 and the chroma in the range of 4 to 14 each expressed by the values of the Munsell standard color table.

INDUSTRIAL APPLICABILITY

In accordance with the present invention, a colored resin composition which exhibits excellent fastness and prevention of formation of blisters in the test of resistance to chlorine water used for sterilization, has the color tone within the color solid composed of the hue in the range of 10 B to 10 PB, the lightness in the range of 2 to 6 and the chroma in the range of 4 to 14 each expressed by the values of the Munsell standard color table and shows little discoloration in the test of resistance to chlorine water while the blue color is maintained without formation of any color other than the blue color can be obtained by using a combination of a cobalt blue pigment which shows little discoloration and does not form blisters in the test of resistance to chlorine water, titanium dioxide pigment which has excellent resistance to chlorine water and an excellent hiding property and a dioxazine pigment and a phthalocyanine pigment which do not form blisters in the test of resistance to chlorine water and exhibits excellent coloring ability as the coloring components of the polyethylene resin for water pipes which contact chlorine water.

What is claimed is:

1. A colored resin composition for water pipes which comprises (A) a polyethylene resin and, per 100 parts by weight of the polyethylene resin, (B) 0.01 to 2.0 parts by weight of (i) a cobalt blue pigment, 0.0001 to 0.2 parts by weight of (ii) at least one pigment selected from phthalocyanine pigments having no metals and metal phthalocyanine pigments having no chlorine atoms or one chlorine atom in a molecule, 0.0001 to 0.2 parts by weight of (iii) a dioxazine pigment and 0.002 to 0.5 parts by weight of (iv) a titanium dioxide pigment.

2. A colored resin composition for water pipes according to claim 1, wherein a color tone is within a color solid composed of a hue in a range of 10 B to 10 PB, a lightness in a range of 2 to 6 and a chroma in a range of 4 to 14 each expressed by values of a Munsell standard color table.

3. A colored resin composition for water pipes according to claim 1, wherein a color tone is within a color solid composed of a hue in a range of 10 B to 10 PB, a lightness in a range of 2 to 6 and a chroma in a range of 4 to 14 each expressed by values of a Munsell standard color table after a test of resistance to chlorine water in accordance with a method of Japanese Industrial Standard K 6762 for 500 hours.

4. A colored resin composition for water pipes according to claim 2, wherein a color tone is within a color solid composed of a hue in a range of 10 B to 19 PB, a lightness in a range of 2 to 6 and a chroma in a range of 4 to 14 each expressed by values of a Munsell standard color table after a test of resistance to chlorine water in accordance with a method of Japanese Industrial Standard K 6762 for 500 hours.

5. A colored resin composition for water pipes according to claim 1, wherein the dioxazine pigment of component (iii) of component (B) is at least one compound selected from compounds expressed by formula [1] and formula [2]:

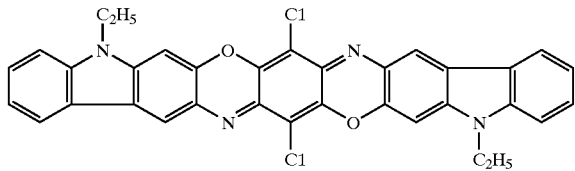

[1]

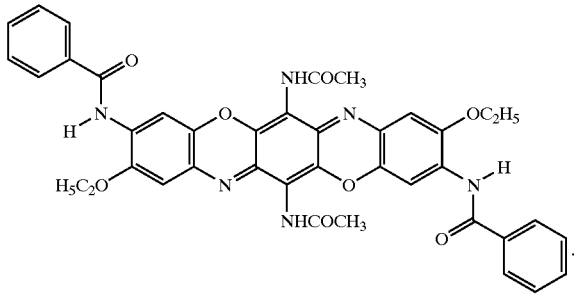

[2]

6. A colored resin composition for water pipes according to claim 2, wherein the dioxazine pigment of component (iii) of component (B) is at least one compound selected from compounds expressed by formula [1] and formula [2]:

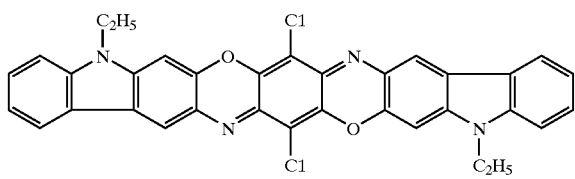

[1]

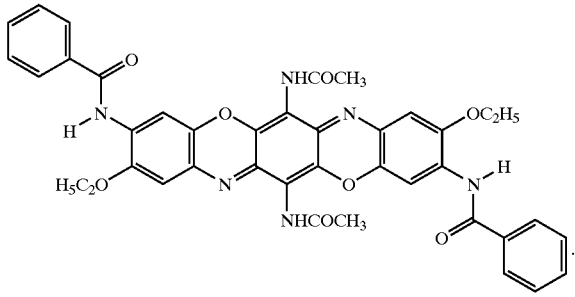

[2]

7. A colored resin composition for water pipes according to claim 3, wherein the dioxazine pigment of component (iii) of component (B) is at least one compound selected from compounds expressed by formula [1] and formula [2]:

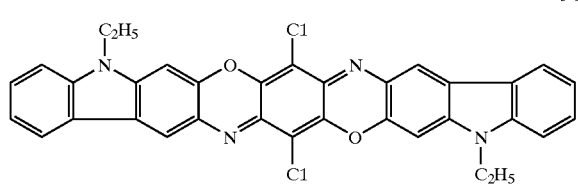

[1]

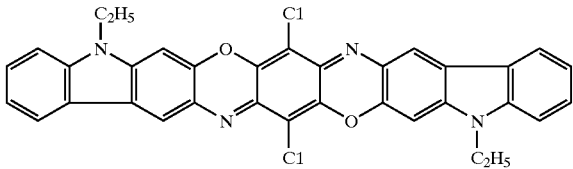

[1]

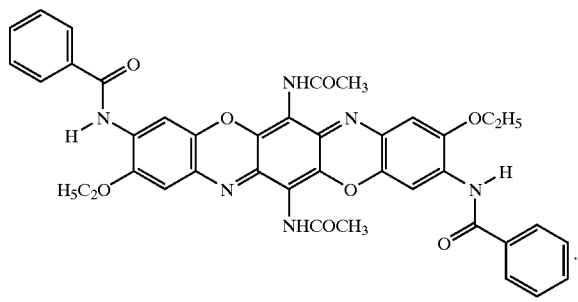

[2]

8. A colored resin composition for water pipes according to claim 4, wherein the dioxazine pigment of component (iii) of component (B) is at least one compound selected from compounds expressed by formula [1] and formula [2]:

[2]

9. A colored water pipe which comprises a colored polyethylene resin composition and has a color tone within a color solid composed of a hue in a range of 10 B to 10 PB, a lightness in a range of 2 to 6 and a chroma in a range of 4 to 14 each expressed by values of a Munsell standard color table before and after a test of resistance to chlorine water in accordance with a method of Japanese Industrial Standard K 6762 for 500 hours.

* * * * *

UNITED STATES PATENT AND TRADEMARK OFFICE
CERTIFICATE OF CORRECTION

PATENT NO.     : 6,448,312 B1
DATED          : September 10, 2002
INVENTOR(S)    : Kotaro Ohshima et al.

It is certified that error appears in the above-identified patent and that said Letters Patent is hereby corrected as shown below:

<u>Title page,</u>
Item [75], Inventors, "Oshima" should be replaced with -- Ohshima --;

<u>Column 15,</u>
Line 59, delete "19" and insert -- 10 --.

Signed and Sealed this

Thirteenth Day of July, 2004

JON W. DUDAS
*Acting Director of the United States Patent and Trademark Office*